US012645876B2

(12) United States Patent
Gashteovski et al.

(10) Patent No.: US 12,645,876 B2
(45) Date of Patent: Jun. 2, 2026

(54) AUTO-CORRECTING FRAMEWORK FOR OPEN INFORMATION EXTRACTION SYSTEMS

(71) Applicant: NEC Laboratories Europe GmbH, Heidelberg (DE)

(72) Inventors: Kiril Gashteovski, Heidelberg (DE); Ammar Shaker, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 306 days.

(21) Appl. No.: 18/304,382

(22) Filed: Apr. 21, 2023

(65) Prior Publication Data

US 2024/0273288 A1     Aug. 15, 2024

Related U.S. Application Data

(60) Provisional application No. 63/444,276, filed on Feb. 9, 2023.

(51) Int. Cl.
*G06F 40/253* (2020.01)

(52) U.S. Cl.
CPC .................................. *G06F 40/253* (2020.01)

(58) Field of Classification Search
CPC ........ G06F 40/253; G06F 40/30; G06F 40/58; G06F 40/284; G06F 40/49; G06F 40/295; G06N 5/022; G06N 3/045; G06N 3/08
See application file for complete search history.

(56) References Cited

U.S. PATENT DOCUMENTS

| 8,954,359 B2 | 2/2015 | Huang et al. |
| 9,442,917 B2 | 9/2016 | Dou et al. |
| (Continued) | | |

FOREIGN PATENT DOCUMENTS

| JP | 2018156332 A | 10/2018 |
| JP | 2019212289 A | 12/2019 |
| WO | WO 2020/177142 A1 | 9/2020 |

OTHER PUBLICATIONS

Abedini, Farhad, Mohammad Reza Keyvanpour, and Mohammad Bagher Menhaj. "Correction Tower: A general embedding method of the error recognition for the knowledge graph correction." International Journal of Pattern Recognition and Artificial Intelligence 34.10 (2020): 2059034. (Year: 2020).*

(Continued)

*Primary Examiner* — Bhavesh M Mehta
*Assistant Examiner* — Jangwoen Lee
(74) *Attorney, Agent, or Firm* — Leydig, Voit & Mayer, Ltd.

(57) ABSTRACT

A method for auto-correcting information extracted by an open information extraction system includes inputting an input triple extracted from an input sentence to a grammaticality model trained to output whether the input triple is grammatical or ungrammatical. The input triple is corrected based on the grammaticality model outputting that the input triple is ungrammatical. Embodiments of the present invention can be used in a variety of machine learning and artificial intelligence applications, including but not limited to several anticipated use cases in material informatics, data security, data extraction, and medical/healthcare, for example, for supporting decision making or optimizing and calibrating of extracted chemical compounds from libraries of textbooks and publications.

17 Claims, 5 Drawing Sheets

(56) References Cited

U.S. PATENT DOCUMENTS

| | | | |
|---|---|---|---|
| 10,482,384 | B1 | 11/2019 | Stoilos et al. |
| 10,978,056 | B1 * | 4/2021 | Challa ................. G06F 16/3344 |
| 11,494,420 | B2 | 11/2022 | Chen et al. |
| 2019/0354544 | A1 * | 11/2019 | Hertz ..................... G06N 5/025 |
| 2020/0073933 | A1 | 3/2020 | Zhao et al. |
| 2020/0380211 | A1 | 12/2020 | Fan et al. |
| 2021/0081612 | A1 | 3/2021 | Saito et al. |
| 2022/0156582 | A1 | 5/2022 | Sengupta et al. |
| 2022/0300544 | A1 * | 9/2022 | Potter .................... G06N 3/088 |
| 2022/0309254 | A1 | 9/2022 | Kotnis et al. |
| 2022/0383867 | A1 * | 12/2022 | Faulkner ................. G10L 15/16 |

OTHER PUBLICATIONS

Melo, André, and Heiko Paulheim. "An approach to correction of erroneous links in knowledge graphs." CEUR Workshop Proceedings. vol. 2065. RWTH Aachen, 2017. (Year: 2017).*

Caldeira, João, et al. "Profiling Software Developers with Process Mining and N-Gram Language Models." arXiv preprint arXiv:2101.06733 (2021). (Year: 2021).*

Yao, Liang, Chengsheng Mao, and Yuan Luo. "KG-BERT: BERT for knowledge graph completion." arXiv preprint arXiv:1909.03193 (2019). (Year: 2019).*

Abedini, Farhad et al.; "Correction Tower: A General Embedding Method of the Error Recognition for the Knowledge Graph Correction"; *International Journal of Pattern Recognition and Artificial Intelligence*; Jan. 8, 2020; pp. 1-38; vol. 34, No. 10; World Scientific Publishing Co Pte Ltd; Singapore.

Pereira Gomes Costa, Hermani et al.; "Automatic Extraction and Validation of Lexical Ontologies from text"; MSC Thesis in Informatics Engineering; Oct. 7, 2011; pp. 1-124; LAP Lambert Academic Publishing; Saarbruecken, Germany.

Del Corro, Luciano et al.; "ClausIE: Clause-Based Open Information Extraction"; *2013 Proceedings of the 22nd international conference on World Wide Web*; May 13, 2013; pp. 355-366; ACM Publications; New York, NY, USA.

Devereux, Barry et al.; "Large-Scale Acquisition of Feature-Based Conceptual Representations from Textual Corpora"; *Proceedings of the Annual Meeting of the Cognitive Science Society*; Jul. 14, 2010; pp. 49-54; vol. 32; Wiley-Blackwell; Hoboken, NJ, USA.

Fensel, Dieter et al.; "*Knowledge Graphs: Methodology, Tools and Selected Use Cases*"; Jan. 31, 2020; 156 pages; ISBN 978-3-030-37438-9; Springer Nature; Berlin, Germany.

Gashteovski, Kiril et al.; "OPIEC: An Open Information Extraction Corpus"; *Automated Knowledge Base Construction*; Apr. 28, 2019; pp. 1-19; ArXiv.org, Cornell University; Ithaca, NY, USA.

Gashteovski, Kiril et al.; "BenchIE: A Framework for Multi-Faceted Fact-Based Open Information Extraction Evaluation"; *Proceedings of the 60th Annual Meeting of the Association for Computational Linguistics*; Apr. 13, 2022; pp. 4472-4490; vol. 1; MIT Press; Cambridge, MA, USA.

Jiang, Zhengbao et al.; "Improving Open Information Extraction via Iterative Rank-Aware Learning"; *Proceedings of the 57th Annual Meeting of the Association for Computational Linguistics*; May 31, 2019; pp. 5295-5300; MIT Press; Cambridge, MA, USA.

Nakamachi, Akifumi et al.; "Text Simplification with Reinforcement Learning using Supervised Rewards on Grammaticality, Meaning Preservation, and Simplicity"; *Proceedings of the 1st Conference of the Asia-Pacific Chapter of the Association for Computational Linguistics and the 10th International Joint Conference on Natural Language Processing: Student Research Workshop*; Dec. 2020; pp. 153-159; MIT Press; Cambridge, MA, USA.

* cited by examiner

AUTO-CORRECTING FRAMEWORK FOR OPEN INFORMATION EXTRACTION SYSTEMS

CROSS-REFERENCE TO PRIOR APPLICATION

Priority is claimed to U.S. Provisional Application Ser. No. 63/444,276 filed on Feb. 9, 2023, the entire contents of which is hereby incorporated by reference herein.

FIELD

The present invention relates to artificial intelligence (AI) and machine learning, and in particular to a method, system and computer-readable medium for auto-correcting triples in an open information extraction (OIE) system.

BACKGROUND

There are huge amounts of information available today which can be used by different applications, for example AI and machine learning applications for learning to make predictions. Most of the available information, however, is stored in natural language unstructured format. This renders such textual data unusable for computers because the textual data is not written in a machine-readable manner. To structure such information into a machine-readable format, which can later be used for improving other downstream tasks, OIE systems have been used. Such OIE systems include special purpose computers programmed to extract information from (unstructured) natural language sentences into structured (subject, relation, object)-triples, where each part of an OIE triple (subject, relation or object) is typically referred to as a "slot". However, current OIE systems extract many noisy triples (i.e., triples that contain extraction errors in one or more of the slots), and do not have functionality to correct errors, which makes their further use limited, results in downstream errors and loss in prediction accuracy. In particular, the errors are usually propagated to the correspondingly induced knowledge graphs and any prediction decisions derived from them.

SUMMARY

In an embodiment, the present invention provides a method for auto-correcting information extracted by an open information extraction system. The method includes inputting an input triple extracted from an input sentence to a grammaticality model trained to output whether the input triple is grammatical or ungrammatical. The method further includes correcting the input triple based on the grammaticality model outputting that the input triple is ungrammatical.

Embodiments of the present invention can be used in a variety of applications, including but not limited to several anticipated use cases in material informatics, data security, data extraction, and medical/healthcare, for example, optimizing and calibrating of extracted chemical compounds from libraries of textbooks and publications.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
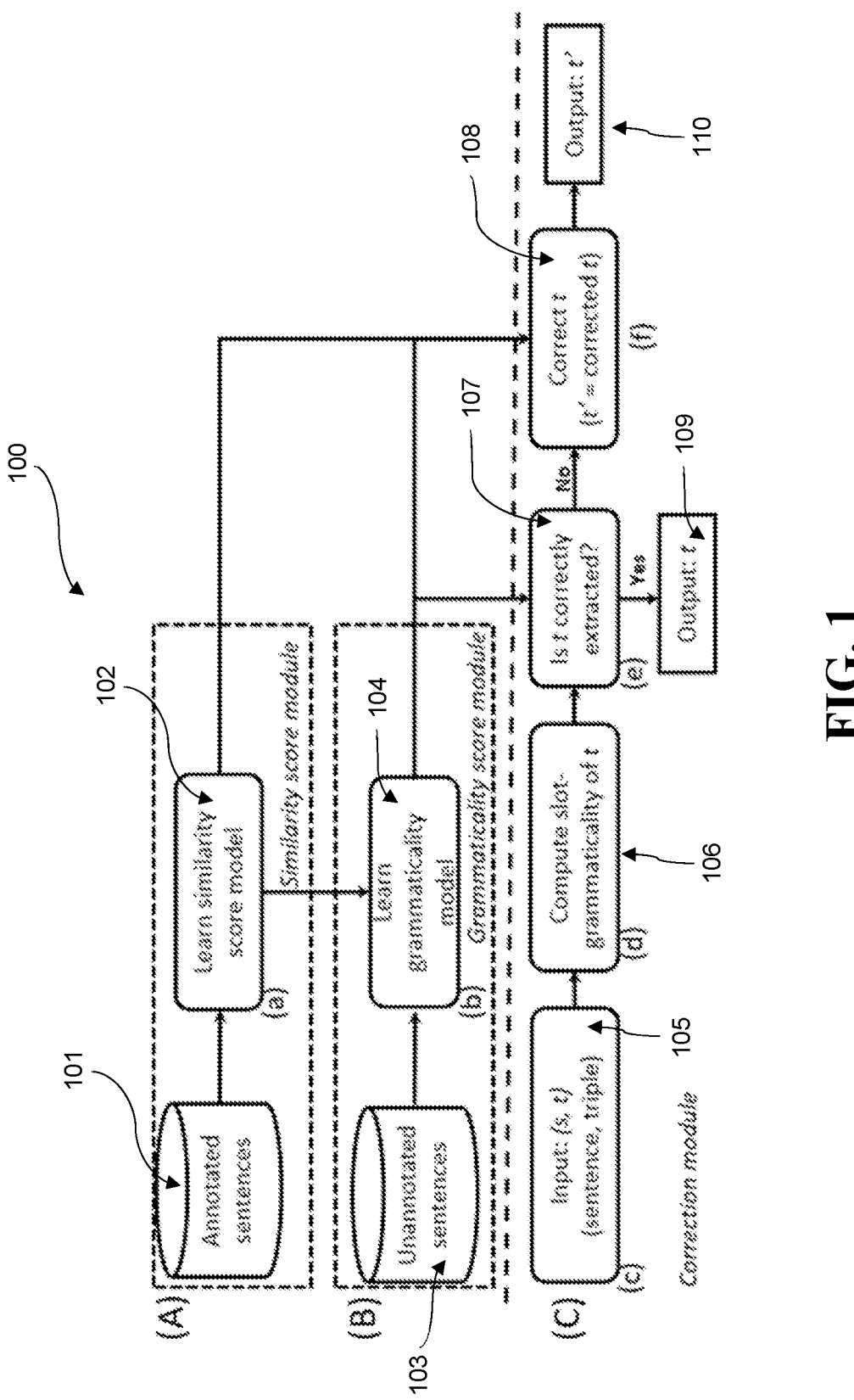
FIG. 1 schematically illustrates a method and system for correcting triples in an OIE system according to an embodiment of the present invention.

Embodiments of the present invention improve the functionality of existing OIE systems, and in particular the special-purpose computers used therein, by providing an auto-correcting framework. In particular, embodiments of the present invention enable: (1) identifying likely erroneous extractions by the OIE system; (2) pinpointing the slot where the error is likely to occur; and (3) automatically correcting the errors. Consequently, embodiments of the present invention enhance the functionality and improve the accuracy of OIE systems, for example, enabling to build cleaner and more accurate open knowledge graphs, which in turn can be used to provide more accurate predictions in AI and machine learning applications. Moreover, embodiments of the present invention can be provided to improve OIE systems generally as the inventive methodology (1) makes no assumptions about the OIE system that it learns to correct; and (2) works on correcting extractions of OIE systems that work on any input language (e.g., not only on English). Thus, embodiments of the present invention provide the flexibility to be used independent of machine learning modeling and language.

As mentioned above, existing OIE systems extract rather noisy information. This means that some of the slots (subject, relation or object) could have incorrect or missing information, or have redundant information. For example, consider the input sentence s: "Michael Jordan, who was born in Brooklyn, grew up in Wilmington". An OIE system should extract the following triples: $t_1$: ("Michael Jordan"; "was born in"; "Brooklyn") and $t_2$: ("Michael Jordan"; "grew up in"; "Wilmington"). However, an OIE system may extract the erroneous extraction $t_3$: ("Michael Jordan"; "was born grew"; "Brooklyn"), where the word "grew" should be replaced with the word "in".

Embodiments of the present invention improve the functionality of the special-purpose computers of an OIE system by providing an automated error correction mechanism. In particular, embodiments of the present invention improve the existing technology to be able to take an input sentence and an input triple, and return a corrected OIE triple as an output. For example, if the OIE system according to an embodiment of the present invention gets the sentence s and the triple $t_1$ as an input, it will also return triple $t_1$ as an output because triple $t_1$ is a correctly extracted triple and does not need any correcting. If, however, the OIE system according to an embodiment of the present invention gets the sentence s and the triple $t_3$ as input, it will return triple $t_1$ as output, because triple $t_3$ is incorrect and is corrected into the correct triple $t_1$.

The problem of producing completely correct extractions presents a number of technical obstacles, and, according to current literature, current state of the art OIE systems suffer from a number of technical limitations and are not able to produce extractions that perform higher than 35% of the $F_1$ score. Further, current approaches do not attempt to correct an incorrectly extracted triple. In particular, existing OIE systems are limited to computing a final confidence score of the entire extraction, without offering any way to correct extractions with low confidence scores. Moreover, existing OIE systems provide confidence scores that are not well calibrated, which results in confidence scores that are unrealistically optimistic.

Embodiments of the present invention provide for auto-correction of extraction errors by: (1) learning a function that, given an input sentence and an incorrect extraction, returns the most similar correct extraction; (2) learning a grammaticality threshold, which is used for estimating whether each slot of the OIE extraction is grammatical; and (3) given an input sentence and an OIE triple, if any of the slots of the OIE triple is not grammatically correct (e.g., its grammaticality score is lower than the grammaticality threshold), computing the most similar OIE extraction that is grammatical and returning it as an output.

According to a first aspect, the present invention provides a method for auto-correcting information extracted by an open information extraction system. The method includes inputting an input triple extracted from an input sentence to a grammaticality model trained to output whether the input triple is grammatical or ungrammatical. The method further includes correcting the input triple based on the grammaticality model outputting that the input triple is ungrammatical.

According to a second aspect, the present invention provides the method according to the first aspect, further comprising identifying which slot or slots of the input triple are ungrammatical.

According to a third aspect, the present invention provides the method according to the first or second aspect, wherein the identifying which slot or slots of the input triple are ungrammatical is performed by computing a grammaticality score for each slot of the input triple and comparing the grammaticality scores of the slots to an overall grammaticality score computed for the input triple.

According to a fourth aspect, the present invention provides the method according to any of the first to third aspects, further comprising generating a set of new triples by sampling from the input sentence and replacing the slot or slots of the input triple identified to be ungrammatical with candidate words or phrases given a fixed relation with slot or slots of the input triple that were not identified to be ungrammatical.

According to a fifth aspect, the present invention provides the method according to any of the first to fourth aspects, wherein the input triple and the set of new triples are input to a similarity score model trained to determine similarity scores between the input triple and each of the new triples.

According to a sixth aspect, the present invention provides the method according to any of the first to fifth aspects, wherein the input triple is corrected using one of the new triples determined by the similarity score model to be most similar to the input triple.

According to a seventh aspect, the present invention provides the method according to any of the first to sixth aspects, wherein the similarity score model is trained by: classifying triples extracted by the open information extraction system as being positive or negative; and determining a shortest string similarity between each of the negative triples and the positive triples to determine one of the positive triples as being a correct triple for the respective negative triple, wherein the correct triples are used in training data for the similarity score model, the training data being in a form of an anchor, a positive and a random positive, wherein the anchor is the respective negative triple, the positive is the correct triple determined for the respective negative triple, and the random positive is a different one of the positive triples.

According to an eighth aspect, the present invention provides the method according to any of the first to seventh aspects, wherein the positive triples are determined from annotated sentences used as input for the training, and wherein the negative triples are determined using an evaluation protocol and comparing the triples extracted by the open information extraction system to the positive triples.

According to a ninth aspect, the present invention provides the method according to any of the first to eighth aspects, wherein the evaluation protocol indicates which slot or slots is/are erroneous for each of the negative triples, and wherein the shortest string similarity is determined between each of the erroneous slots and a same slot of the positive triples that have other slots that correspond to the respective negative triple.

According to a tenth aspect, the present invention provides the method according to any of the first to ninth aspects, wherein the shortest string similarity is determined using a Levenshtein distance.

According to an eleventh aspect, the present invention provides the method according to any of the first to tenth aspects, wherein the grammaticality model is trained by: computing abstract representations of unannotated sentences; computing n-gram grammaticality scores of the abstract representations; classifying triples extracted by the open information extraction system as being positive or negative; computing abstract phrases for each of the positive and negative triples; and using the n-gram grammaticality scores and the abstract phrases for each of the positive and negative triples as training data to a machine learning model.

According to a twelfth aspect, the present invention provides the method according to any of the first to eleventh aspects, wherein the n-gram grammaticality scores are determined using perplexity measurements.

According to a thirteenth aspect, the present invention provides the method according to any of the first to twelfth aspects, wherein the machine learning model is a neural network classifier based on a long short-term memory or transformer-based neural model.

According to a fourteenth aspect, the present invention provides a system for auto-correcting information extracted by an open information extraction system comprising one or more hardware processors which, alone or in combination, are configured to provide for execution of the steps of any of the methods of the first to thirteenth aspects.

According to a fifteenth aspect, the present invention provides a tangible, computer-readable medium having instructions there which, upon being executed by one or more processors, provides for execution of the steps of any of the methods of the first to thirteenth aspects.

FIG. 1 schematically illustrates a method and system 100 for correcting triples in an OIE system. The system consists of three modules: (A) a similarity score module; (B) a grammaticality score module; and (C) a correction module. The first module, (A) the similarity score module, is configured to learn a similarity network that brings incorrect triples closer to their corresponding correct ones. In particular, the similarity score module uses annotated sentences 101 as input and in step (a) learns a similarity score model at block 102. The second module, (B) the grammaticality score module, evaluates the correctness of extracted triples. In particular, the grammaticality score module uses unanno- tated sentences 103 as input and in step (b) learns a gram- maticality model at block 104. The third module, (C) the correction module, corrects faulty triples by suggesting slot corrections. In particular, in step (c), the correction module receives an input sentence s and a triple t as input 105. In step (d), the correction module provides a computation of slot-grammaticality of the triple t 106 and in step (e) determines whether the triple t was correctly extracted using the grammaticality model 104. In particular, in step (d), a grammaticality score is computed for each slot of the triple t, e.g., using an evaluation protocol or statistical measure, as discussed further below. For instance, the score can be a real number within the interval [0, 1] where 0 means the slot is completely ungrammatical and 1 means the slot is com- pletely grammatical.

Figure 2:
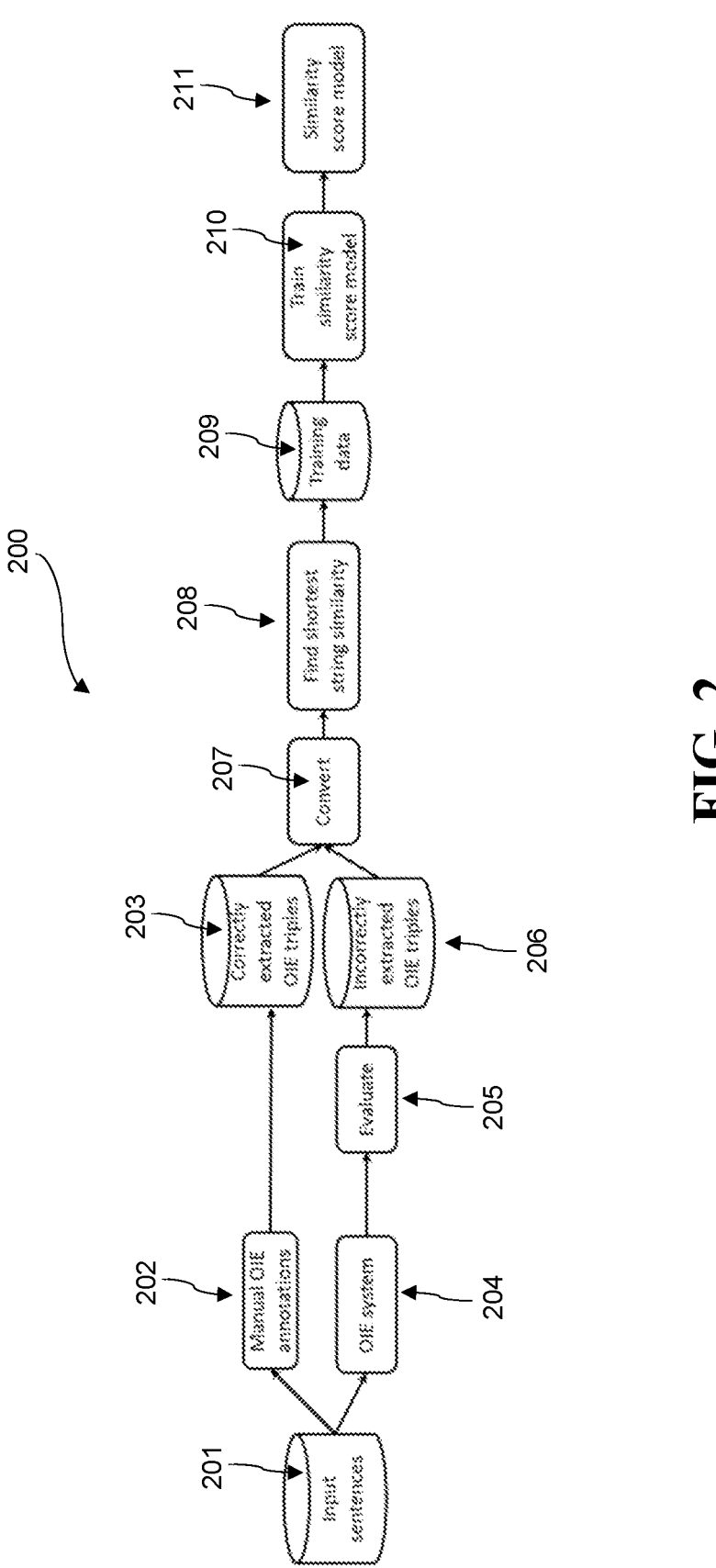
FIG. 2 schematically illustrates a similarity score module according to an embodiment of the present invention.

(A) Similarity Score Module:

FIG. 2 schematically illustrates an overall architecture of a similarity score module according to an embodiment of the present invention, and in particular illustrates a method and system 200 for learning a similarity score model 211 as in step (a)/block 102 of FIG. 1. Given an input of a negative OIE triple (i.e., an OIE triple that is incorrectly extracted), the goal of the similarity score module is to train the similarity score model 211 so that it provides the highest similarity score to another OIE triple such that it is a positive OIE triple (i.e., an OIE triple that is correctly extracted). This can also be seen as error-invariant mapping, where an incorrectly extracted OIE triple is embedded close to a correct counterpart. Advantageously, the similarity score module is not dependent on a particular language (e.g., English) and works on any language.

First, the similarity score module is given a large set of manually annotated input sentences 201 as input. For each sentence, the manual OIE annotations 202 are all possible OIE extractions that a human can make from a given input sentence, resulting in a database of correctly extracted OIE triples 203. In parallel, an existing OIE system 204 is run. Then, the OIE extractions produced by the existing OIE system 204 are evaluated against the golden OIE annotations done by humans in the database of correctly extracted OIE triples 203. An exhaustive OIE benchmark, such as BenchIE (see Kiril Gashteovski, Mingying Yu, Bhushan Kotnis, Carolin Lawrence, Mathias Niepert, and Goran Glavaš, "BenchIE: A Framework for Multi-Faceted Fact-Based Open Information Extraction Evaluation," In Proceedings of the 60th Annual Meeting of the Association for Computa- tional Linguistics (Volume 1: Long Papers), pp. 4472-4490 (2022), which is hereby incorporated by reference herein), is used for the evaluation protocol 205 of the OIE extractions. By using the evaluation protocol 205, a database of incor- rectly extracted OIE triples 206 (incorrect triples) are obtained. The set of manual OIE annotations 202 by humans forms the database of the correctly extracted OIE triples 203.

The evaluation protocol 205 also provides information about where exactly the error occurred, in particular, in which slot the error exists. The evaluation protocol 205 (e.g., BenchIE) can determine whether an extraction is correct provided labeled data (e.g., labeled by a human or expert). At block 207, there is a conversion of the words in the extractions with symbols. For example, the extraction ("Mi- chael Jordan"; "was born in"; "Brooklyn") is converted into something like (AB; CDE; F). Next, the shortest string similarity distance 208 is determined between an incorrect triple and all the correct triples. In particular, for the strings of each incorrect slot in the incorrect triple, a minimum edit distance is computed between the incorrect triple and all correct triples. This can be any minimum edit distance algorithm (e.g., the Levenshtein Distance between two strings). Preferably, this computation on slot level is done only for the incorrect slots (the correct slots are simply matched). Illustrating this step through an example, take the following input sentence and corresponding triples (as per the prior example):

s: "Michael Jordan, who was born in Brooklyn, grew up in Wilmington".

$t_1$: ("Michael Jordan"; "was born in"; "Brooklyn")→cor- rect triple $t_2$: ("Michael Jordan"; "born in"; "Brooklyn")→correct triple $t_3$: ("Michael Jordan"; "grew up in"; "Wilmington") →correct triple $t_4$: ("Michael Jordan" "was born grew"; "Brooklyn") →incorrect triple; incorrect slot(s): relation $t_5$: ("Michael Jordan"; "was"; "Brooklyn")→incorrect triple; incorrect slot(s): relation The incorrect triple is triple $t_4$ and it has only one incorrect slot: the relation. Because the subject and object are correct, these slots are matched against the correct triples. This gives two candidates: triple $t_1$ and triple $t_2$. For incorrect triple $t_4$, the goal is to pick which of the correct triples is the closest match. For this, the incorrect slot from triple $t_4$ (the relation) is then compared with the same slot of triple $t_1$ and triple $t_2$. In particular, the conversion at block 207 converts each word to a symbol (e.g., the string "Michael Jordan" can be represented as "AB" and "Michael Nielsen" as "AC"). Then, to this converted representation of the string, the Leven- shtein distance algorithm is applied to measure how far from each other are two phrases. Because, for example, the Levenshtein Distance between the relation of triple $t_4$ and triple $t_1$ is four, and between triple $t_4$ and triple $t_2$ is eight, the minimum is taken as the appropriate choice (i.e., triple $t_1$). Therefore, the corresponding correct triple for the incorrect triple $t_4$ is determined to be triple $t_1$.

Figure 3:
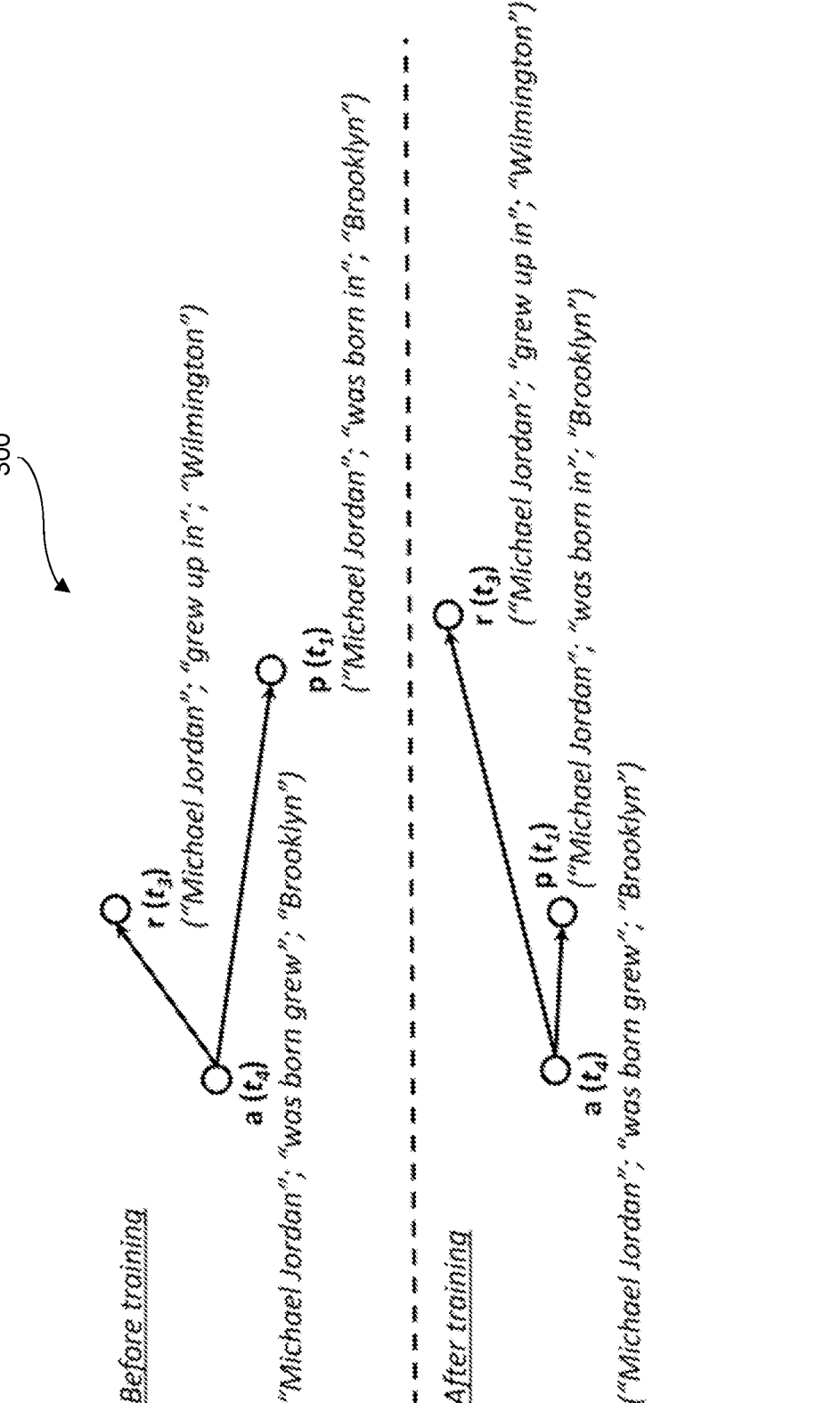
FIG. 3 schematically illustrates learned representations of anchoring, positive and negative triples according to an embodiment of the present invention.

The output of the shortest string similarity step is a training dataset 209, where each data point has the following triplet: (a, p, r), where a (anchor) is the incorrect triple (triple $t_4$), p (positive) is the correct triple (triple $t_1$), and r (random positive) is another randomly selected correct triple (e.g., triple $t_3$) from the most distant triples to the anchor. In the previous example, the data point would be $(t_4, t_1, t_3)$. Then, the similarity score model 211 is trained at block 210 with a triplet loss function $$\left(e.g., \sum \left[\|f(x^a - x^p)\|_2^2 - \|f(x^a - x^r)\|_2^2\right]\right)$$

where $x^a$ is the (anchor) incorrect triple, $x^p$ is the (positive) correct triple and $x^r$ is the random positive triple). The goal is to learn representations such that incorrect triples (a) are pushed closer in the embedding space to their corresponding positive triples (p), and further away for other positive triples (r) (see example of an error correction 300 in FIG. 3).

Figure 4:
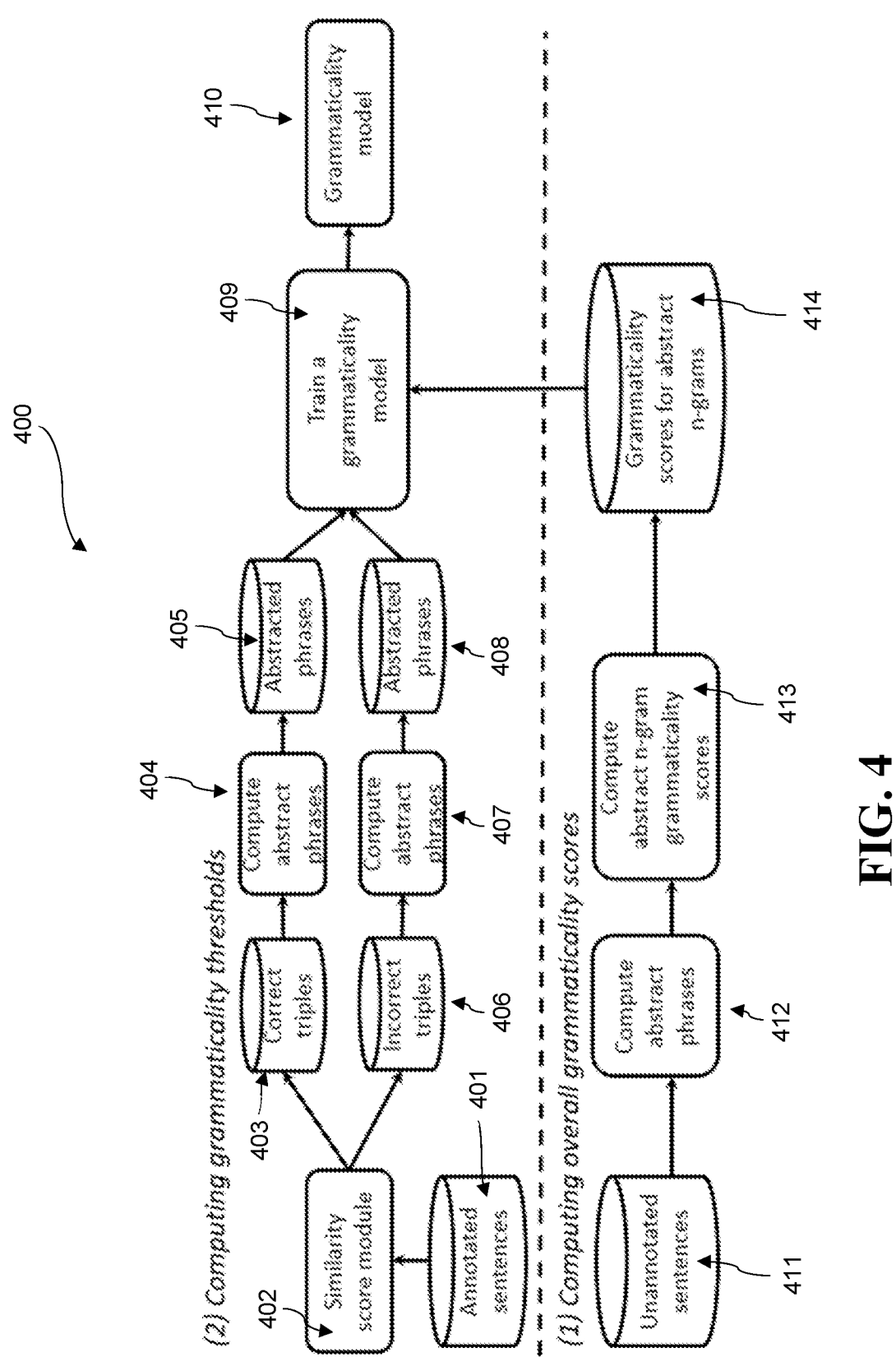
FIG. 4 schematically illustrates a grammaticality score module according to an embodiment of the present invention.

(B) Grammaticality Score Module:

FIG. 4 schematically illustrates the overall architecture of a grammaticality score module according to an embodiment of the present invention and, in particular, illustrates a method and system 400 for the learning of a grammaticality score model 410 as in step (b)/block 104 of FIG. 1. The grammaticality score module uses corpus-based statistics to estimate how grammatically accurate a given phrase is. The grammaticality score module is used in order to learn a threshold for when a phrase is most likely correct or incorrect. The module consists of two major parts: (1) computing grammaticality scores (e.g., via perplexity scores) of abstract phrases from a large corpus of unannotated sentences; and (2) computing thresholds of grammaticality scores (e.g., via perplexity scores) for correct and incorrect phrases that were obtained from the similarity score module (as illustrated in FIG. 2).

As the first part (1), a large corpus of raw unannotated sentences 411 is collected. This could be either a domain-specific corpus (e.g., medical reports) or a general corpus (e.g., the text found in the entire web). Advantageously, embodiments of the invention do not depend on any specific domain or language. Once the data is collected, "abstract phrases" are computed at block 412. This can be any abstract generalization of the words (e.g., part-of-speech tags, lemmas, named-entity types, combinations of such tags, etc.), or simply using no abstract generalization at all (i.e., using the words in the sentences as-is). Then, the n-gram grammaticality scores are computed at block 413. Such grammaticality scores can be any statistical measure that gives low probability scores for n-grams that are not grammatical (e.g., "was born grew" or an abstract n-gram "AUXILARY VERB_PAST VERB_PAST") and high probability scores for n-grams that are grammatical (e.g., "was born in" or an abstract n-gram "AUXILARY VERB_PAST PREPOSITION"). One can use scores such as perplexity, which has been used extensively for unsupervised evaluation of language models. The perplexity score PP of a discrete probability distribution p is, for example, as follows:

$$PP(p) := 2^{H(p)} = 2^{-\sum_x p(x) log_2 p(x)} = \prod_x p(x)^{-p(x)}$$

where H(p) is the entropy of the distribution over possible values x.

Embodiments of the present invention, however, are not limited to perplexity. Once the n-gram grammaticality scores are computed, they are stored in a database of grammaticality scores for abstract n-grams 414 containing information about each n-gram and its corresponding grammaticality score. The assumption is that if a phrase is grammatical, it should have appeared often enough in the large corpus of unannotated sentences 411. If a phrase is not grammatical, then it either appeared very infrequently or did not appear at all.

As the second part (2), the grammaticality model 410 is trained to determine whether a given slot from an OIE triple is grammatical or not. First, the annotated sentences 401 from the similarity score module 402 are used. Then, the set of correct triples 403 and incorrect triples 406 from the similarity score module 402 are retrieved. For example, the set of correct triples 403 can correspond to the correctly extracted triples 203 of FIG. 2 and are produced by manual human annotations, while the incorrect triples 406 can correspond to the incorrectly extracted triples 206 of FIG. 2 and are produced by automatic OIE systems that are automatically evaluated as incorrectly extracted. Next, the abstract phrases are computed at block 404 for the correct triples 403 and at block 407 for the incorrect triples 406 in the same way as in the first part (1), resulting in a database of correct abstracted phrases 405 and a database of incorrect abstracted phrases 408, or in other words databases with negative (incorrect) and positive (correct) abstract phrases from the OIE triples. For each of the abstract phrases, the grammaticality scores for each correctly and incorrectly extracted OIE triple are obtained by using the grammaticality scores that were previously computed on the large corpus of unannotated sentences 411 in the first part (1). In particular, n-gram abstract phrases from real sentences (which contain the grammatical n-grams) are found in part (1), and this information is used for the abstract phrases derived from the correct triples. For the incorrectly extracted phrases, however, it is possible to encounter a phrase that never appeared in the first part (1). In this case, a probabilistic scoring (e.g., perplexity) can be used, which will assign low probability scores on such negative examples At block 409, the grammaticality model 410 is trained. In particular, the grammaticality scores are used as input features for a neural network model that determines whether an input phrase (the abstract representation of the content of the entire triple) is grammatical or not. The phrases are then run through an encoding layer in order to obtain a semantic representation of the phrase (e.g., an embedding layer). Given the positive and negative data, a neural network classifier (e.g., a long short-term memory (LSTM) or transformer-based neural model) is trained that takes an encoded phrase and its associated triples' grammaticality scores (e.g., probability of the subject, the probability of the predicate given the subject, and the probability of the object given each of the subject and the predicate) as input and returns a decision whether the slot is correct or not.

Embodiments of the present invention are flexible and are not specific to any particular trained models. In the case where the grammaticality scores form a bimodal distribution (i.e., the correct and incorrect triples are separable based on their scores), threshold learning would suffice for the identification of the incorrect triples. In this case, a decision whether an input phrase is grammatical or not is based on the decision of whether the computed grammaticality score of the input phrase passes the threshold or not. This particular case simulates the learning of a classifier in the space of grammaticality scores.

Figure 5:
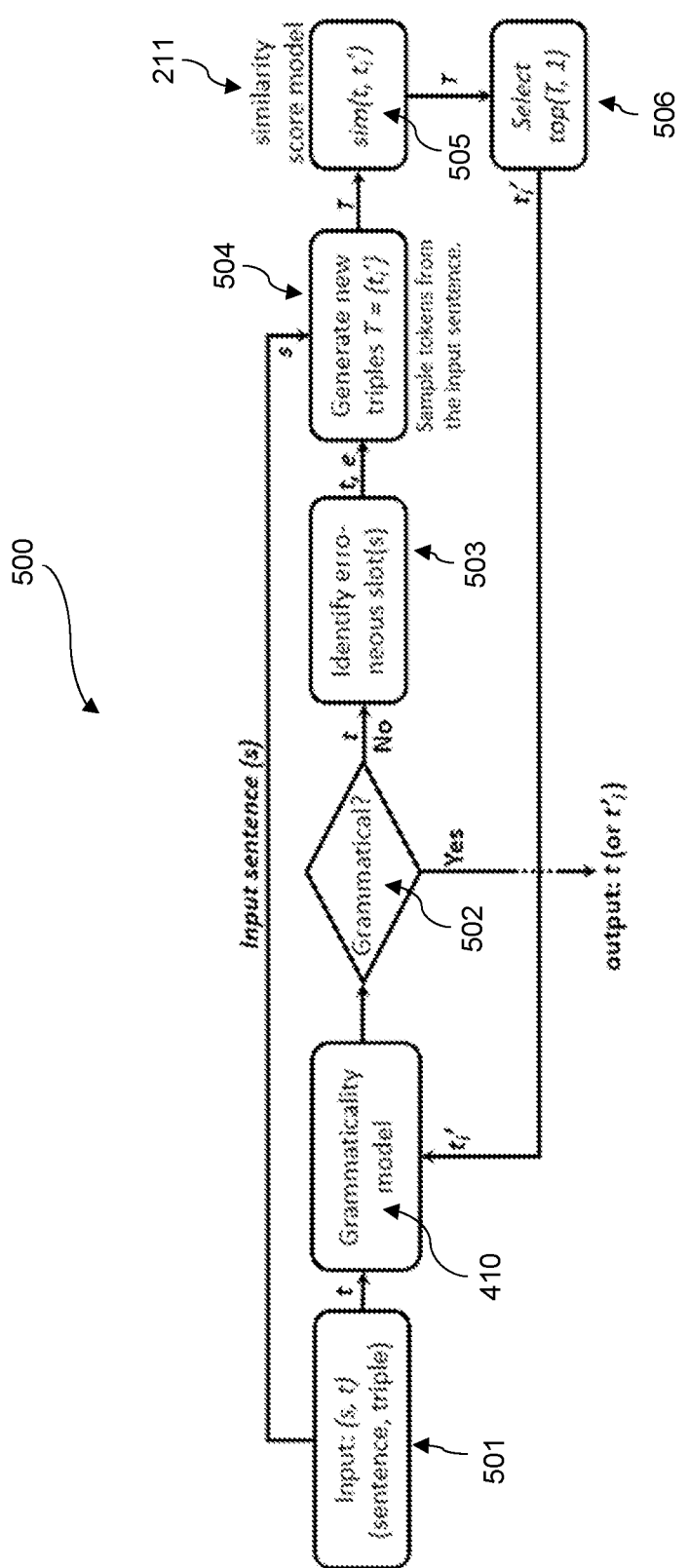
FIG. 5 schematically illustrates a correction module according to an embodiment of the present invention.

(C) Correction Module:

FIG. 5 schematically illustrates the overall architecture of a correction module according to an embodiment of the present invention, and in particular illustrates a method and system 500 for correcting triples. The correction module takes a sentence-triple pair (s, t) and it returns either a corrected triple $t_1'$ (if the triple was assessed to be incorrect) or the same input triple t (if the triple was assessed to be correct).

First, the correction module takes a sentence-triple pair (s, t) as input 501. The triple t from the input is then passed to the grammaticality score model 410. At block 502, if the grammaticality score model 410 classifies the input triple as grammatical, then the correction module outputs the same triple t. If, however, the grammaticality score model 410 classifies the triple as ungrammatical, then the triple is passed to the neural network classifier or an algorithm for identifying erroneous slots at block 503. This determination of which slots are erroneous is different than using the evaluation protocol 205 of FIG. 2, which uses labeled data where there are all possible extractions that can be made out of a sentence. In contrast, the determination of which slot is erroneous in block 503 can be performed automatically with the learned grammaticality score model 410 without requiring labeled data.

Erroneous slots can also be identified at block 503 as follows: (1) checking if the erroneous slot is any of the following slots: subject, relation or object (note it is possible to have more than one erroneous slot (e.g., subject and object); (2) storing the information about what slots are the erroneous ones in a set e; and then (3) passing this information (the triple and the tags for which slots are erroneous) to the generation algorithm for generating a new triple at block 504. Step (1) is not trivial and is explained further in the following. To detect the erroneous slot, each consecutive slot is masked out and the grammaticality of each phrase is computed individually. For this, probabilities of correctness of each phrase/slot can be computed, e.g., using simple corpus statistics with phrase frequencies to drive the probabilities. In particular, the following scores are computed:

$$P_{subj} = \max\left[P(subj|rel, obj), P(subj|rel)\right]$$

$$P_{rel} = \max\left[P(rel|subj), P(rel|obj)\right]$$

$$P_{obj} = \max\left[P(obj|subj, rel), P(obj|rel)\right]$$

If, for example, $P_{obj}$ is significantly lower than the overall score P(subj, rel, obj), then "obj" is marked as being the erroneous slot and it is added to the set e. An amount by which the score can vary with respect to the overall score to be marked erroneous can depend on the data distribution and other factors. For example, a mean value and a standard deviation can be used, and if all slots are lower than the overall score, it is possible that all of the slots were incorrectly extracted. The erroneous triple t is then passed to the generation algorithm at block 504 along with information about which slots are erroneous (e.g., in the example: e={obj}).

The generation algorithm holds the slots that are correct to be frozen. For instance, if e={obj}, then the slots "subj" and "rel" are held frozen. Then, phrases are sampled from the input sentence by selecting a word or list of words from the input sentence that is likely to be the correct object given the fixed subject and relation. The object phrase is then replaced with the candidate phrases to generate new triples T={$t_i'$}. The similarity score model 211 is run using as input the newly generated triples T in order to select the most similar phrase with triple t at block 505. The most similar phrase is passed back at block 506 as a corrected triple $t_i'$ as input to the grammaticality model 410 which outputs a classification of whether this triple is classified as grammatical at block 502. If yes, the cycle stops. If not, another iteration is performed with one difference: the generation algorithm at block 504 knows what triples not to generate or consider because they already did not pass the grammaticality filter, and therefore are likely incorrect.

Embodiments of the present invention can also be practically applied to effect further improvements in various technical fields such as automated healthcare, AI drug development, AI material design and informatics, automated manufacturing and inventory systems, robotics and automated law enforcement, as well as a number of other AI and machine learning systems in which the prediction tasks use knowledge graphs or information extracted by OIE systems.

An embodiment of the present invention can be practically applied for robust drug development with resistance to machine-induced errors, e.g. for developing medicines, chemicals or vaccines, recommending a treatment for a patient and/or predicting patient outcome. In an example of this embodiment, a use case is optimizing and calibrating extracted chemical compounds from libraries of textbooks and publications. The automatic correction of erroneous slots helps in overcoming error propagation caused by faulty OIE systems. The data source here can be the libraries of textbooks and publications. Application of the method according to an embodiment of the present invention predicts erroneous triples and corrects incorrect slots from triples extracted by an OIE system. An output is a verified decision about the list of potential chemical compounds that should replace incorrect slots. As a resulting physical change (technicity), the output of the corrected extractions would contain information about using a particular drug to treat a particular patient, as well as how to treat the patient and/or an expected outcome of the treatment. The open nature of the extractions allows for a wide variety of recommendations and/or automated actions, such as suggesting and/or using a specific chemical for directly treating the patients.

Another embodiment of the present invention can be practically applied for AI material design and informatics. In this embodiment, a use case is extracting and correcting extracted information about the properties of materials from text and log files. This would reduce the time and the costs of errors in the wet-lab costs of material design. The data source here can be research papers, scientific reports, and log files describing the behavior of materials and/or tester feedback, such as the melting point. Application of the method according to an embodiment of the present invention corrects wrongly extracted triples by inspecting the textual data and the extracted triples, predicts erroneous triples and suggests corrections of incorrect slots. An output is a list of corrected triples. As one example of a resulting physical change (technicity), the synthesis process of a material (e.g., a rubber material) can be set by suggesting corrections on the procedure based on the extracted triples. For example, one corrected extraction would discover automatically that rubber X fails for a reason Y, while another corrected extraction suggests a particular method to fix it.

A further embodiment of the present invention can be practically applied to an automated inventory system. In this embodiment, a use case is extracting and correcting extracted information about the stored items in a facility (e.g., a warehouse). The data source here can be facility reports, logs, etc. Application of the method according to an embodiment of the present invention corrects wrongly extracted triples describing the items and where they are located in the facility. An output is a list of corrected triples. One example of a physical change (technicity) is the automatic correction of wrongly extracted information obtained by the triples and, based on these extractions, running another AI system that sends robots in the facility to move the items to the right location.

An even further embodiment of the present invention can be practically applied to an automated law enforcement system, for example, for detection and correction of suspects from textual messages or for event monitoring. In this embodiment, a use case is finding wrongly extracted slots in the output of an OIE system that is important in sensitive domains. The correction of extracted slots helps in improving and optimizing legal procedures. The data source here can be mail text messages, police reports, court protocols, and witness questioning. Application of the method according to an embodiment of the present invention receives the textual data and the extracted triples, predicts erroneous triples and suggests corrections of incorrect slots. An output is a ranked list of wrong triples and suggestions of potential corrections. One example of a physical change (technicity) is the filing of legal actions and police investigations against suspects that were wrongly missed by the OIE systems. This situation allows for running another system on top of the correct OIE extractions, which determines if someone is a suspect. This event can also triggers the situation where the data is written separately due to security reasons.

In an embodiment, the present invention provides a method for auto-correcting triples. In a training phase, a similarity score model is learned (see step (a) in FIG. 1), and grammaticality thresholds are learned as well (see step (b) in FIG. 1). In a testing phase, given an input sentence s and triple t (see step (c) in FIG. 1), slot-grammaticality of the triple t is computed (see step (d)) in order to determine if the triple t was correctly extracted (see step (e) in FIG. 1) and, if not, the triple is corrected (see step (f) in FIG. 1).

Embodiments of the present invention enable the following improvements over existing technology:

1. The correction of incorrect triples extracted by an OIE system by proposing valid corrections of incorrect slots in an automated manner.
2. The correction of incorrect triples by deriving an error-invariant mapping:
   a. Using the (A) similarity module:
      i. Split OIE extractions into positive and negative extracted triples (i.e., correctly extracted and incorrectly extracted triples, respectively).
      ii. Find the shortest string similarity between the incorrect OIE triple and all correct triples.
      iii. Select one correct OIE triple which is the corresponding correct triple for the incorrect (anchoring) triple.
      iv. Generate training data having (a, p, r) triples, where a (anchor) is the incorrect triple, p (positive) is the correct triple, and r (random positive) is another randomly selected correct triple from the most distant triples to the anchor. Preferably, when sampling, triples that are far away in the embedding space are samples, rather than triples that are close in the embedding space.
      v. Learn a similarity score model that, for a given input of an incorrectly extracted triple provides a correctly extracted triple by applying a correction to one or more of the slots.
   b. Using the (B) grammaticality score module (a neural network system for grammaticality classification):
      i. Given a large database of unannotated sentences, compute the abstract representations of the sentence s.
      ii. Compute abstract n-gram grammaticality scores and store them in a database.
      iii. By using the data from the similarity score module, split the OIE triples into correct and incorrect triples.
      iv. Compute the triples' abstract phrases.
      v. Train a machine learning model that classifies a given input OIE triple as grammatical or ungrammatical to label it as correctly extracted or incorrectly extracted, respectively.
   c. Using the (C) correction module, based on the grammaticality score for each suggested correction:
      i. An input pair (s, t), where s is the input sentence and t is the extracted OIE triple from the sentence s, is input through the grammaticality model.
      ii. If the model classifies this triple as "grammatical", the system outputs the input triple t; otherwise, it continues with the following step (iii).
      iii. The system then identifies erroneous slot(s) in the ungrammatical triple t.

vi. The system generates a new set T of candidate triples including at least one candidate triple, and preferably more, such that the method increases the likelihood that the new candidate triples are correct. This is preferably done by sampling from the same input sentence.
      v. The similarity score model computes the similarity between each candidate triple t' from the set T and the input triple t.
      vi. The system then selects the top or top-k most similar triples and loops back to step (i) to check if each of the candidates is grammatical.

In contrast to existing systems for addressing errors in OIE systems, which are limited to computing a confidence score for the OIE extractions produced by certain OIE systems, embodiments of the present invention provide for actually making corrections to the extracted information in an automated manner. Further, in contrast to the confidence scores, which have been observed to be not well calibrated, embodiments of the present invention provide confidence in the corrected triples, resulting in increased accuracy. As a further improvement over existing systems, and even ones which try to calibrate the confidence scores to be more reliable, embodiments of the present invention are flexible, and can be generalized to different models. The existing approaches, in contrast, rely on specific modeling choices and cannot generalize to extraction performed by any OIE system, and in any case, do not provide a mechanism for correcting erroneous extractions and also do not provide information about where a potential error exactly occurs. In contrast, embodiments of the present invention (1) is capable to estimate what OIE triples are likely to be incorrectly extracted and where the error is likely to be; (2) can estimate the correctness of an OIE triple that is extracted from any OIE system; and (3) provides mechanisms to automatically correct the OIE triple to a correct corresponding OIE triple.

Embodiments of the present invention can be used to improve OIE systems generally. For example, an embodiment of the present invention can be part of an overall OIE pipeline, and can be applied to improve every component of it, because it results in producing cleaner, more accurate extractions. For example, embodiments of the present invention can be applied for AI drug development, tumor microenvironment research, detecting suspects (e.g., in email or texts) for public security systems, or for event monitoring (e.g., for incident detection systems or national security systems).

Embodiments of the present invention can be used to improve the performance of OIE systems by detecting faulty triples, correcting them and showing the source of error. In particular, the showing of the source of error provides particular improvements to explainable AI (XAI) systems.

The components of the system according to an embodiment of the present invention provide for improvements both individually and in combination. For example, the similarity score model can improve an existing OIE system by enabling to generate a correct OIE triple such that it is semantically close to the erroneous OIE extraction. The similarity score module also helps to build the correction module. The grammaticality score module can improve an existing OIE system by enabling to detect if an OIE triple is correct or not, rather than the system having to rely on confidence scores, which cannot pinpoint where the error exactly is. The grammaticality score module also enables the correction module to be able to generate OIE triples that are both (1) correct; and (2) semantically close to the erroneous triple. The correction module can improve an existing OIE system by enabling to automatically correct the erroneous input OIE triples. No existing system is able to perform such correction on OIE extractions.

The following references are incorporated by reference herein:

Kiril Gashteovski, Sebastian Wanner, Sven Hertling, Samuel Broscheit and Rainer Gemulla, "OPIEC: an open information extraction corpus," In Proceedings of the Conference on Automated Knowledge Base Construction (2019).

Zhengbao Jiang, Pengcheng Yin and Graham Neubig, "Improving open information extraction via iterative rank-aware learning," Proceedings of the 57th Conference of the Association for Computational Linguistics (Volume 1: Long Papers), pp. 5295-5300 (2019).

Luciano del Corro and Rainer Gemulla. "ClausIE: clause-based open information extraction," In Proceedings of the 22nd International World Wide Web Conference, pp. 355-366 (2013).

Akifumi Nakamachi, Tomoyuki Kajiwara and Yuki Arase, "Text Simplification with Reinforcement Learning using Supervised Rewards on Grammaticality, Meaning Preservation, and Simplicity," In Proceedings of the 1st Conference of the Asia-Pacific Chapter of the Association for Computational Linguistics and the 10th International Joint Conference on Natural Language Processing: Student Research Workshop (2020).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for auto-correcting information extracted by an open information extraction system, the method comprising:

inputting an input triple extracted from an input sentence to a grammaticality model trained to output whether the input triple is grammatical or ungrammatical; and correcting the input triple based on the grammaticality model outputting that the input triple is ungrammatical.

2. The method according to claim 1, further comprising identifying which slot or slots of the input triple are ungrammatical.

3. The method according to claim 2, wherein the identifying which slot or slots of the input triple are ungrammatical is performed by computing a grammaticality score for each slot of the input triple and comparing the grammaticality scores of the slots to an overall grammaticality score computed for the input triple.

4. The method according to claim 3, further comprising generating a set of new triples by sampling from the input sentence and replacing the slot or slots of the input triple identified to be ungrammatical with candidate words or phrases given a fixed relation with slot or slots of the input triple that were not identified to be ungrammatical.

5. The method according to claim 4, wherein the input triple and the set of new triples are input to a similarity score model trained to determine similarity scores between the input triple and each of the new triples.

6. The method according to claim 5, wherein the input triple is corrected using one of the new triples determined by the similarity score model to be most similar to the input triple.

7. The method according to claim 5, wherein the similarity score model is trained by:

classifying triples extracted by the open information extraction system as being positive or negative; and determining a shortest string similarity between each of the negative triples and the positive triples to determine one of the positive triples as being a correct triple for the respective negative triple, wherein the correct triples are used in training data for the similarity score model, the training data being in a form of an anchor, a positive and a random positive, wherein the anchor is the respective negative triple, the positive is the correct triple determined for the respective negative triple, and the random positive is a different one of the positive triples.

8. The method according to claim 7, wherein the positive triples are determined from annotated sentences used as input for the training, and wherein the negative triples are determined using an evaluation protocol and comparing the triples extracted by the open information extraction system to the positive triples.

9. The method according to claim 8, wherein the evaluation protocol indicates which slot or slots is/are erroneous for each of the negative triples, and wherein the shortest string similarity is determined between each of the erroneous slots and a same slot of the positive triples that have other slots that correspond to the respective negative triple.

10. The method according to claim 9, wherein the shortest string similarity is determined using a Levenshtein distance.

11. The method according to claim 1, wherein the grammaticality model is trained by:

computing abstract representations of unannotated sentences;

computing n-gram grammaticality scores of the abstract representations;

classifying triples extracted by the open information extraction system as being positive or negative;

computing abstract phrases for each of the positive and negative triples; and using the n-gram grammaticality scores and the abstract phrases for each of the positive and negative triples as training data to a machine learning model.

12. The method according to claim 11, wherein the n-gram grammaticality scores are determined using perplexity measurements.

13. The method according to claim 11, wherein the machine learning model is a neural network classifier based on a long short-term memory or transformer-based neural model.

14. A system for auto-correcting information extracted by an open information extraction system comprising one or more hardware processors which, alone or in combination, are configured to provide for execution of the following steps:

inputting an input triple extracted from an input sentence to a grammaticality model trained to output whether the input triple is grammatical or ungrammatical; and correcting the input triple based on the grammaticality model outputting that the input triple is ungrammatical.

15. A tangible, non-transitory computer-readable medium containing instructions which, upon being executed by one or more processors, provide for execution of the following steps:

inputting an input triple extracted from an input sentence to a grammaticality model trained to output whether the input triple is grammatical or ungrammatical; and correcting the input triple based on the grammaticality model outputting that the input triple is ungrammatical.

16. The method according to claim 1, wherein the grammaticality model was trained based on n-gram grammaticality scores computed for unannotated sentences from medical reports, and wherein the input sentence is taken from one of the medical reports or a different medical report that is being processed by the open information extraction system.

17. A method for training a grammaticality model for an open information extraction system, the method comprising:

computing abstract representations of unannotated sentences;

computing n-gram grammaticality scores of the abstract representations;

classifying triples extracted by the open information extraction system as being positive or negative;

computing abstract phrases for each of the positive and negative triples; and using the n-gram grammaticality scores and the abstract phrases for each of the positive and negative triples as training data to a machine learning model.

* * * * *